(12) United States Patent
Tierney

(10) Patent No.: US 7,172,204 B1
(45) Date of Patent: Feb. 6, 2007

(54) STORAGE CADDY FOR AN AUTOMOBILE HARDTOP AND MISCELLANEOUS OBJECTS

(76) Inventor: Norman L. Tierney, 17011 Cedar Plaza, #1C, Omaha, NE (US) 68130

( * ) Notice: Subject to any disclaimer, the term of this patent is extended or adjusted under 35 U.S.C. 154(b) by 59 days.

(21) Appl. No.: 10/914,546

(22) Filed: Aug. 9, 2004

(51) Int. Cl.
*B62B 3/10* (2006.01)

(52) U.S. Cl. .................................. 280/79.11; 280/79.7

(58) Field of Classification Search .............. 280/79.11, 280/79.2, 79.3, 79.4, 79.6, 79.7, 47.34; 248/129; 206/335; D34/17, 23
See application file for complete search history.

(56) References Cited

U.S. PATENT DOCUMENTS

| 1,441,264 | A | | 1/1923 | Bruewer |
| 2,817,436 | A | | 12/1957 | Simpson |
| 4,085,844 | A | | 4/1978 | Dunchock |
| D251,550 | S | | 4/1979 | Bladis |
| 4,326,726 | A | | 4/1982 | Dunchock |
| D265,517 | S | | 7/1982 | Dunchock |
| D288,739 | S | | 3/1987 | Johnson, Jr. et al. |
| 4,679,805 | A | | 7/1987 | Cunningham |
| D300,071 | S | | 2/1989 | Dunchock |
| D303,031 | S | * | 8/1989 | Ellis ........................... D34/31 |
| 4,867,465 | A | | 9/1989 | Dunchock |
| 5,221,066 | A | | 6/1993 | Ferrigan et al. |
| 5,253,887 | A | * | 10/1993 | Marenger ................... 280/79.3 |
| 5,445,279 | A | | 8/1995 | Warner |
| 6,019,235 | A | * | 2/2000 | Ferrigan ...................... 211/195 |
| 6,234,432 | B1 | | 5/2001 | Piller et al. |
| 6,729,632 | B2 | | 5/2004 | Ferrigan |
| 6,786,494 | B2 | * | 9/2004 | Garbiso ........................ 280/38 |

* cited by examiner

*Primary Examiner*—Christopher P. Ellis
*Assistant Examiner*—Brian Swenson
(74) *Attorney, Agent, or Firm*—Thomte, Mazour & Niebergall; Shane M. Niebergall

(57) ABSTRACT

A storage device is provided for storing a vehicle hardtop in a generally upright position. Rearward and forward support members extend upwardly from a base to position the vehicle hardtop with its rearward portion safely facing in an upward direction. The cavity of the hardtop is oriented to permit the storage of a plurality of miscellaneous objects on the base and within the cavity area of the hardtop. Non-abrasive material is provided along the device to prevent damage to the hardtop. Optional wheels are provided to mobilize the storage device.

20 Claims, 4 Drawing Sheets

STORAGE CADDY FOR AN AUTOMOBILE HARDTOP AND MISCELLANEOUS OBJECTS

BACKGROUND OF THE INVENTION

1. Field of the Invention

The present invention relates to storage devices for automobile hardtops, and more particularly to a storage device that will secure a hardtop in a position that safely orients the side windows of the hardtop and further provides ample storage for miscellaneous objects of considerable size and weight.

2. Description of the Prior Art

Convertible automobiles may be designed so that the top retracts into a rear storage position. However, several types of convertible automobiles are designed so that their tops are removed from the automobile body. This type of automobile design provides various design considerations, including the use of different interchangeable tops. For example, several off-road vehicles may offer as many as three or more different types of tops for use on a single vehicle. Soft tops, made from fabric and flexible plastic material, come in a variety of sizes, including half and full coverage. They are typically collapsible and may even roll-up, making them easy to store. A hardtop is desirable for its ability to keep the weather, noise and intruders out of the interior portion of the automobile. However, once the hardtop is removed, it is oftentimes difficult to store in a convenient location at all, let alone a location where the hardtop is adequately protected from damage.

The prior art has provided a number of different automobile hardtop storage carts. For example, U.S. Pat. No. 5,445,279 to Warner discloses a cart that stores a vehicle hardtop so that the rearward edge of the hardtop is disposed adjacent the forward edge of the storage cart. An angled brace extends upwardly from the cart to support the rearward portion of the hardtop, while a forward lip on the cart engages the rearward edge of the hardtop. Unfortunately, this design does not work with hardtops from many different off-road convertible vehicles, where the rearward portion of the hardtop is provided with a lift gate that only secures in a closed position when it is attached to the vehicle. Otherwise, when such a hardtop is removed from the vehicle and stored with its rearward portion facing the ground, the lift gate is allowed to swing free, where it is oftentimes damaged or simply becomes a nuisance when storing the hardtop. Furthermore, the storage cart disclosed secures the hardtop so that its center of gravity is positioned closely adjacent the forward edge of the storage cart. This may result in an unstable design that is prone to tipping. More importantly, the design provided is inadequate for the storage of any miscellaneous objects, such as other vehicle accessories, such as the soft top, or snow tires. Accordingly, the large footprint of the storage cart is used for a limited purpose.

Accordingly, what is needed is a storage cart for a vehicle hardtop that stores the hardtop in a position that greatly reduces the likelihood of damage to the hardtop during storage and facilitates the ease with which it is positioned within and removed from the storage cart. However, the storage cart must also provide additional storage for miscellaneous objects of various shapes and sizes without increasing the floor space occupied by the storage cart.

SUMMARY OF THE INVENTION

A storage device for an automobile hardtop is provided with a generally planar base. Rearward and forward support members are provided that extend upwardly from the base, adjacent a rearward edge portion of the base. The rearward and forward support members are positioned a spaced distance from one another so that they may releasably receive at least the forward end portion of the automobile hardtop between one another. The rearward and forward support members are preferably shaped and sized so that the cavity of the hardtop faces in a forward direction, with the rearward portion of the hardtop facing upwardly, when the hardtop is received between the rearward and forward support members. In this position, the storage device provides a storage area for miscellaneous objects, which is bounded by the base, the forward support member and the cavity of the hardtop. Preferably, the storage area is shaped and sized to permit the user to store miscellaneous objects having large and possibly irregular shapes, such as a plurality of automobile tires.

In a preferred embodiment, a non-abrasive material is disposed along the surfaces of the storage device that come into contact with the vehicle hardtop. The non-abrasive material may also be provided in the form of a resiliently deformable material to cushion against the weight of the hardtop, when it is being stored. In one preferred embodiment, a support frame may be provided that extends at least partially between the rearward and forward support member and is positioned to support the forward end portion of the hardtop in a spaced relationship above the base to provide additional storage space along a substantial portion of the base. Optional wheels may be secured to the bottom of the base in order to provide a degree of mobility to the storage device.

Accordingly, it is a principle object of the present invention to provide a storage device for a vehicle hardtop that secures the hardtop in a position that reduces the likelihood of damage to the windows and lift gate of the hardtop.

A further object of the present invention is to provide a storage device for a vehicle hardtop that positions the hardtop in such a manner that allows for the storage of a plurality of miscellaneous objects over a substantial portion of the storage device's footprint.

Still another object of the present invention is to provide a storage device that is capable of simultaneously storing a vehicle hardtop and a plurality of miscellaneous objects, such as a set of snow tires.

Yet another object of the present invention is to provide a mobile storage device for simultaneously storing a vehicle hardtop and other vehicle accessories that secures the hardtop and accessories on the device in such a manner that the device resists tipping in any direction while it is moved from one location to another.

A further object of the present invention is to provide a storage device for vehicle hardtops and miscellaneous objects that is relatively simple and inexpensive to manufacture and use.

These and other objects of the present invention will be apparent to those skilled in the art.

DESCRIPTION OF THE PREFERRED EMBODIMENT

Figure 1:
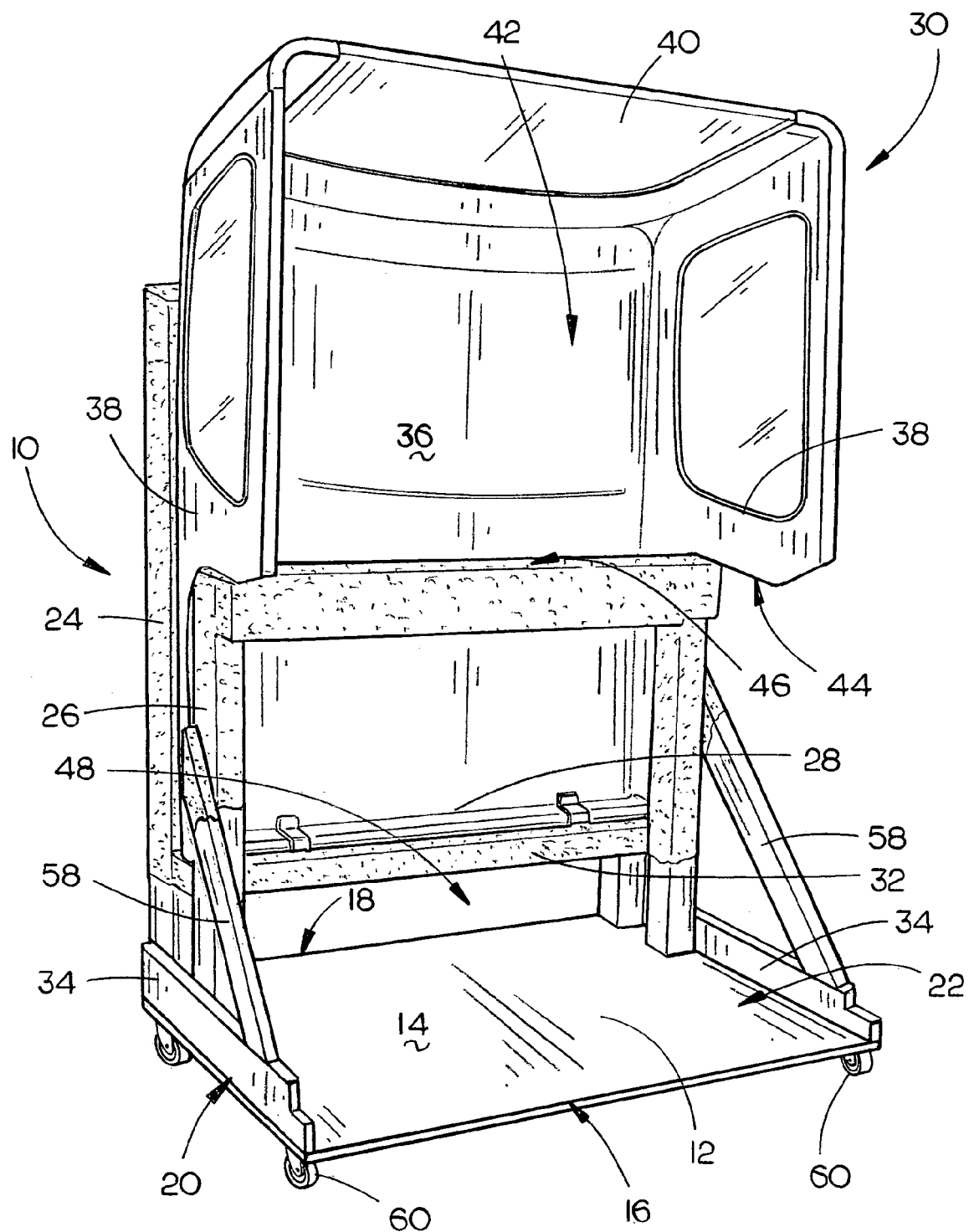
FIG. 1 is an isometric view of one embodiment of the storage device of the present invention as the same could be used to temporarily store a vehicle hardtop.
Figure 2:
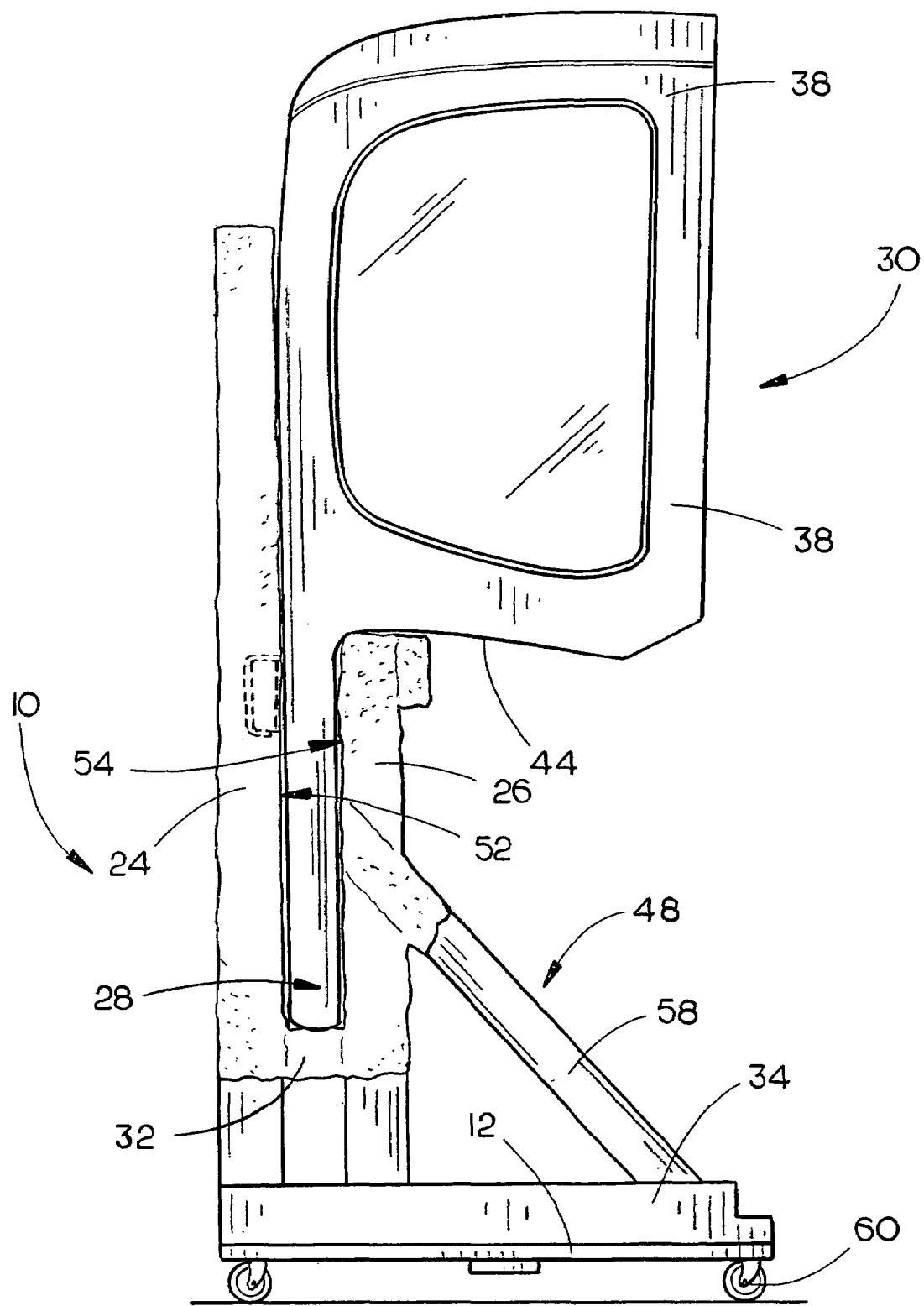
FIG. 2 is a side elevation view of the storage device depicted in FIG. 1.

The storage device or caddy 10 of the present invention is generally depicted in a number of preferred embodiments in FIGS. 1–4. The caddy 10 is provided with a generally planar base 12 having an upper surface 14, a forward edge portion 16, a rearward edge portion 18, a first side portion 20 and an opposite, second side portion 22. A rearward support member 24 extends upwardly from the base 12, adjacent the rearward edge portion 18. A forward support member 26 extends upwardly from the base 12 adjacent, but forwardly a spaced distance from, the rearward support 24. The width of the distance between the rearward support 24 and the forward support 26 should be at least great enough so that a forward end portion 28 of a vehicle hardtop 30 may be easily disposed therein, as depicted. While the rearward support member 24 and forward support member 26 are depicted as extending perpendicularly from the base 12, it is contemplated that they may be configured to extend upwardly from the base 12 at an angle. However, where the rearward support member 24 and forward support member 26 are disposed at a significant angle from perpendicular, it will be preferred that they are angled in a manner that places a majority of the weight of the hardtop 30 over the middle portion of the base 12 for stability.

An optional support frame may be provided to extend at least partially between the rearward support member 24 and the forward support member 26 to support the forward end portion 28 of the vehicle hardtop 30 in a spaced relationship above the upper surface 14 of the base 12. One example of such a support frame is the generally horizontal shelf member 32, depicted in FIG. 1, which is coupled between the rearward support member 24 and the forward support member 26, and extends from one side of the caddy 10 to the other. In another embodiment, the support frame may simply be provided by a pair of opposite side braces 34 that are positioned adjacent the first and second side portions 20 and 22 of the base 12. The height of the side braces 34 will determine the distance at which the hardtop 30 is supported above the upper surface 14 of the base 12. Where no support frame is provided, the forward end portion 28 of the hardtop 30 will be positioned closely adjacent the upper surface 14 of the base 12.

Figure 4:
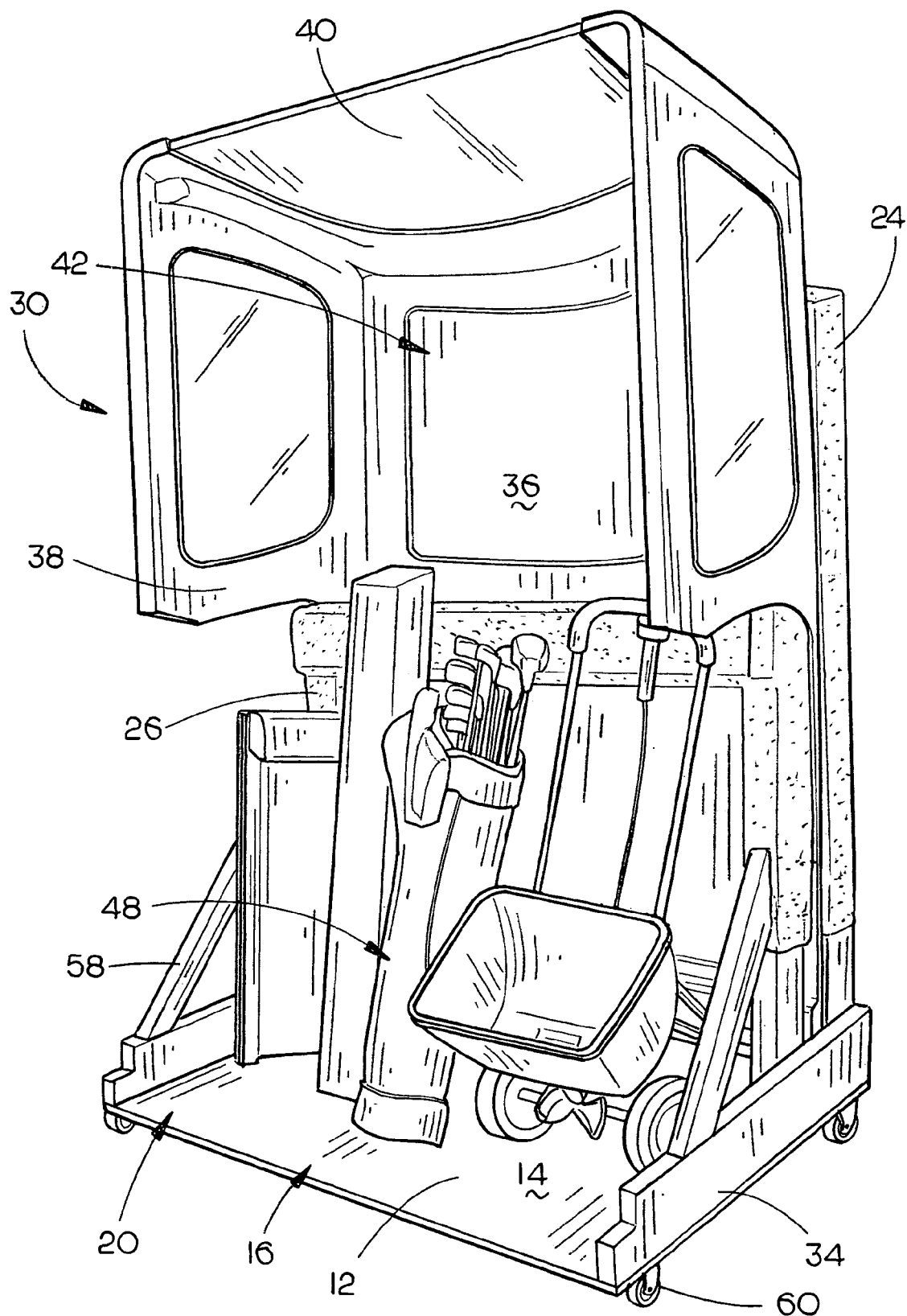
FIG. 4 is an isometric view of still another embodiment of the storage device of the present invention as the same could be used to simultaneously store a vehicle hardtop and a plurality of miscellaneous objects.

It is contemplated that most vehicle hardtops, such as the hardtop 30 depicted in FIGS. 1 and 4, will have an upper wall 36, a pair of opposing side walls 38 and a rearward wall having a lift gate 40. Together, those structures define a cavity 42. It is preferred that the rearward support member 24 and the forward support member 26 be sized and shaped so that the cavity 42 of the hardtop 30 faces in a generally forward direction when the hardtop 30 is received by the rearward support member 24 and forward support member 26. In this manner, it is contemplated that the forward support member 26 will be shorter than the rearward support member 24. As depicted in FIGS. 1 and 4, the shorter forward support member 26 will permit the opposite side walls 38 of the hardtop 30 to extend forwardly, beyond the forward support member 26, while the rearward support member 24 provides even support along a substantial length of the upper wall 36. Where the design of the hardtop 30 provides opposing side walls 38 with a sufficiently stable leading edge 44, a top surface 46 of the forward support member 26 may be sized and shaped according to the circumstances to provide a measure of support to the leading edge 44 of the opposing side walls 38. In this manner, some of the weight-bearing stress may be alleviated from the forward edge portion 28 of the hardtop 30.

Figure 3:
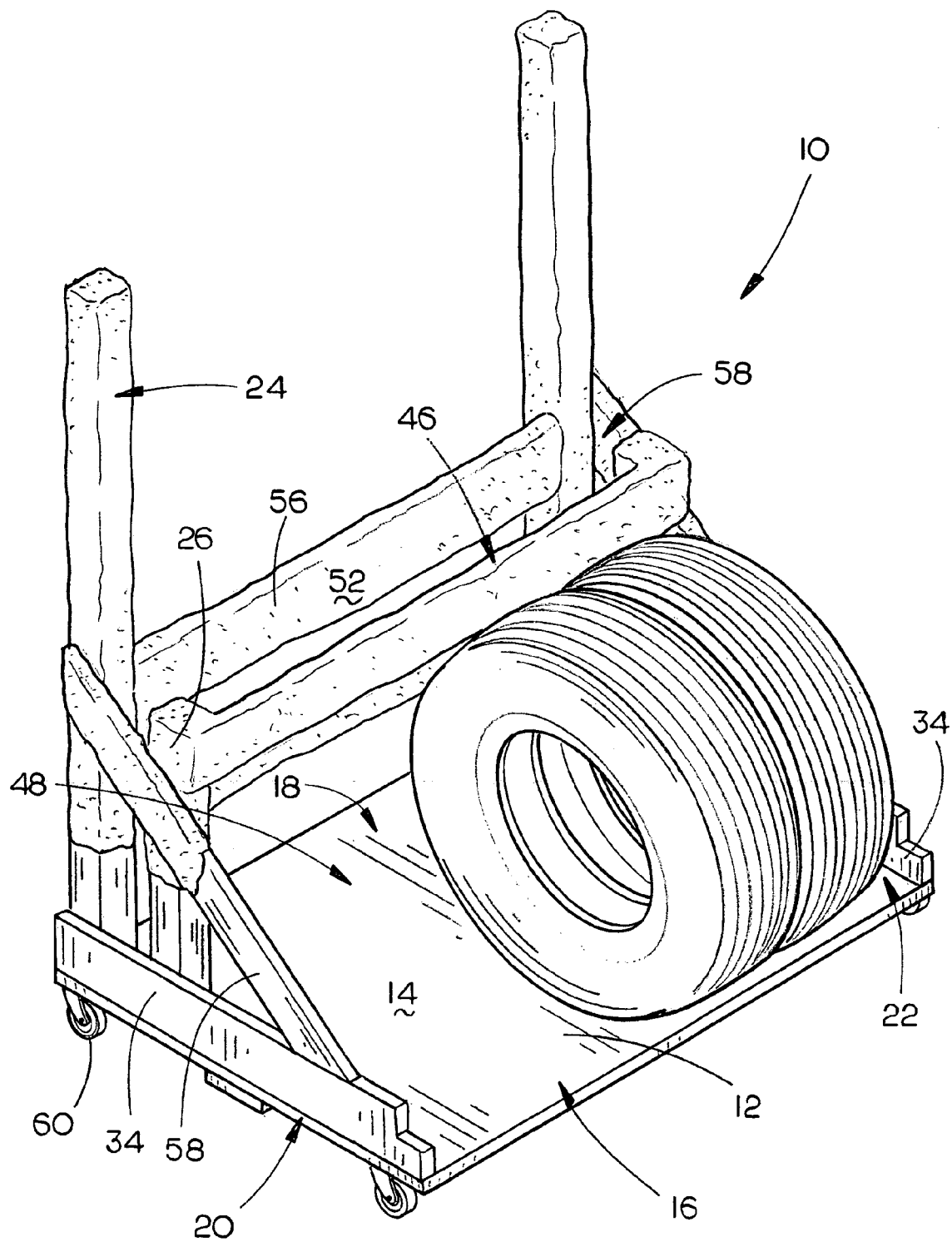
FIG. 3 is an isometric view of one embodiment of the storage device of the present invention.

By positioning the hardtop 30 so that its cavity 42 is positioned to face in a generally forward direction, the center of gravity for the hardtop 30 will be positioned above the middle portion of the caddy 10. This position will greatly increase the stability of the caddy 10 and reduce the likelihood that the caddy 10 can be tipped in any direction accidentally when a hardtop 30 is being stored thereon, particularly when the caddy 10 is moved from one place to another while supporting the hardtop 30. Moreover, by positioning the rearward support member 24 and forward support member 26 adjacent the rearward edge portion of the base 12, a storage area 48 is created for storing miscellaneous objects of various sizes and shapes. The storage area 48 is bounded by the base 12, the forward support member 26 and the cavity 42 of the hardtop 30, when the hardtop 30 is disposed on the caddy 10. As depicted in FIGS. 3 and 4, the storage area 48 will tend to have a size sufficient for storing tall and oddly shaped objects, such as golf clubs, fertilizer spreaders, and the like. It is envisioned that the caddy 10 could provide storage for a wide range of accessories for an automobile, including the hardtop 30, a set of snow tires, a soft top, and the like, simultaneously. It should be clear that by providing a support frame, such as the shelf member 32, the hardtop 30 is elevated to provide a greater amount of storage space on the upper surface 14 of the base 12. Moreover, as the position of the hardtop 30 is elevated, taller objects, such as the golf clubs, or skis may be positioned within the storage area 48. Accordingly, a unique advantage is attained in that it can store a vehicle hardtop 30 and a plurality of miscellaneous objects, simultaneously, without occupying a significant amount of additional floor space than that which would be occupied by the miscellaneous objects alone.

In a preferred embodiment, a non-abrasive material will be disposed along any surfaces of the caddy 10 which may come into contact with the hardtop 30 as it is being stored. For example, a forward facing surface 52 of the rearward support member 24 and a rearward facing surface 54 of the forward support member 26 will come into contact with the hardtop 30 when it is being stored. Other surfaces may include, but will not be limited to, the top surface 46 of the forward support as well as those structures utilized as a support frame, such as the shelf member 32 or the side braces 34. It is contemplated that a nearly endless array of non-abrasive substances would suffice, such as various plastics, rubbers, open or closed-cell foam, fabrics, carpeting and certain woods and metals. A deformably resilient material may be preferred for those surfaces that will be weight bearing.

In a preferred embodiment, a pair of support braces 58 are provided in an angular orientation to extend along the sides of the caddy 10 to provide support to at least the forward support member 26, as depicted in FIG. 1. Where the support braces 58 do not extend beyond the forward support member 26 to the rearward support member 24, the open space between the rearward support member 24 and the forward support member 26 remains open, providing an avenue through which the hardtop may be inserted or withdrawn. By extending the support braces 58 so that they are also firmly secured to the rearward support member 24, the hardtop 30 will be prevented from its unintentional lateral withdrawal from the caddy 10.

A plurality of wheels 60 may be secured to the lower surface of the base 12 in order to make the caddy 10 selectively mobile. It may be preferred that one or more of the wheels 60 be capable of being secured in a locked position so that the caddy 10 remains in a secure position while the hardtop 30 is disposed within or removed from the caddy 10.

In the drawings and in the specification, there have been set forth preferred embodiments of the invention and although specific items are employed, these are used in a generic and descriptive sense only and not for purposes of limitation. Changes in the form and proportion of parts, as well as a substitution of equivalents, are contemplated as circumstances may suggest or render expedient without departing from the spirit or scope of the invention as further defined in the following claims.

Thus it can be seen that the invention accomplishes at least all of its stated objectives.

I claim:

1. A storage device for an automobile hardtop having an upper wall, a pair of opposing side walls, a lift gate and a forward end portion that together define an inner cavity, the storage device comprising:
   a generally planar base having an upper surface, forward and rearward edge portions and opposite side portions;
   a rearward support member extending upwardly from said base adjacent said rearward edge portion;
   a forward support member extending upwardly from said base adjacent said rearward support; said forward support member being positioned a spaced distance forwardly from said rearward support member so that said rearward and forwards support members may releasably receive at least the forward end portion of said automobile hardtop between one another;
   said rearward and forward support members being shaped and sized so that the cavity of the hardtop faces in a forward direction when the hardtop is received by said rearward and forward support members.

2. The storage device of claim 1 wherein said forward support member is positioned rearwardly from the forward edge portion of said base a sufficient distance to form a storage area for miscellaneous objects that is at least partially bounded by said base, said forward support member and the cavity of the hardtop when the hardtop is received by said rearward and forward support members.

3. The storage device of claim 2 wherein said storage area is shaped and sized to at least store a plurality of automobile tires.

4. The storage device of claim 1 further comprising a support frame that extends at least partially between said rearward and forward support members and is positioned to support the forward end portion of the hardtop in a spaced relationship above the upper surface of said base.

5. The storage device of claim 4 wherein said support frame is comprised of a pair of side braces that extend upwardly from said base and extend at least partially between said rearward and forward support members adjacent the opposite side portions of said base.

6. The storage device of claim 4 wherein said support frame is comprised of a generally horizontal shelf member extending between said rearward and forward support members.

7. The storage device of claim 1 further comprising a pair of support braces, each being operatively coupled with said rearward and forward support members and said base.

8. The storage device of claim 7 wherein said support braces are positioned so that, when the hardtop is received between the rearward and forward support members, at least the forward end portion of the hardtop is disposed within a pocket formed by said forward and rearward support members and said support braces.

9. The storage device of claim 5 further comprising a pair of support braces, each being operatively coupled with said rearward and forward support members and said side braces.

10. The storage device of claim 1 further comprising a generally non-abrasive material disposed on a forwardly facing surface of said rearward support member and a rearwardly facing surface of said forward support member to reduce the likelihood of damage to the hardtop when it is disposed between said rearward and forward support members.

11. The storage device of claim 10 wherein said non-abrasive material is resiliently deformable to further reduce the likelihood of damage to the hardtop when it is disposed between, and removed from between, said rearward and forward support members.

12. The storage device of claim 10 further comprising a support frame that extends at least partially between said rearward and forward support member and is positioned to support the forward end portion of the hardtop in a spaced relationship above the upper surface of said base.

13. The storage device of claim 12 wherein said forward support member is shaped and sized to support the side walls of the hardtop when the forward end portion of the hardtop is being supported by said support frame.

14. The storage device of claim 13 wherein an upwardly facing surface of said support frame and an upwardly facing surface of said forward support member are both provided with a resiliently deformable material to reduce the likelihood of damage to the hardtop.

15. The storage device of claim 14 wherein said forward support member is positioned rearwardly from the forward edge portion of said base a sufficient distance to form a storage area for miscellaneous objects that is at least partially bounded by said base, said forward support member and the cavity of the hardtop when the hardtop is received by said rearward and forward support members.

16. The storage device of claim 15 further comprising a plurality of wheels operatively coupled to a lower surface of said base so that the device may be selectively rolled along an operating surface from one location to another.

17. A storage device for an automobile hardtop having an upper wall, a pair of opposing side walls, a lift gate and a forward end portion that together define an inner cavity, the storage device comprising:
   a generally planar base having upper and lower surfaces, forward and rearward edge portions and opposite side portions;
   a plurality of wheels operatively coupled to the lower surface of said base;
   a plurality of elongated rearward support members extending upwardly from said base, adjacent said rearward edge portion;
   a plurality of elongated forward support members extending upwardly from said base adjacent said rearward support members; said forward support members being positioned a spaced distance forwardly from said rearward support members so that at least the forward end portion of said automobile hardtop may be releasably received between said rearward support members and said forward support members;
   said forward and rearward support members being sized and positioned relative to one another so that the cavity of the hardtop faces in a forward direction when the hardtop is received between said rearward and forward support members.

18. The storage device of claim 17 further comprising an elongated support rail extending between said plurality of forward support members; said support rail being positioned to engage the side walls of the hardtop when the forward end portion of the hardtop is received between the rearward and forward support members.

19. The storage device of claim 18 further comprising a support frame that extends at least partially between said rearward and forward support members and is positioned to support the forward end portion of the hardtop in a spaced relationship above the upper surface of said base.

20. The storage device of claim 19 further comprising a deformably resilient material disposed on said support rail, forwardly facing surfaces of said rearward support members and rearwardly facing surfaces of said forward support members to reduce the likelihood of damage to the hardtop when it is disposed between said rearward and forward support members.

\* \* \* \* \*